United States Patent
Plamthottam

(10) Patent No.: US 6,639,007 B2
(45) Date of Patent: *Oct. 28, 2003

(54) ELASTOMERIC COPOLYMER COMPOSITIONS AND ARTICLES MADE THEREWITH

(75) Inventor: Sebastian Plamthottam, Upland, CA (US)

(73) Assignee: Tactyl Technologies, Inc., Vista, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 86 days.

(21) Appl. No.: 08/749,655

(22) Filed: Nov. 15, 1996

(65) Prior Publication Data

US 2003/0119972 A1 Jun. 26, 2003

(51) Int. Cl.⁷ .................................................. C08L 9/00
(52) U.S. Cl. .................... 524/571; 524/575; 2/161.7; 264/301; 264/303; 604/349
(58) Field of Search .............................. 524/536, 571, 524/575; 2/161.7; 264/301, 303; 604/349

(56) References Cited

U.S. PATENT DOCUMENTS

| | | |
|---|---|---|
| 2,133,947 A | 10/1938 | Boecler |
| 2,371,883 A | 3/1945 | Gammeter et al. |
| 2,847,715 A | 8/1958 | Dosmann |
| 3,025,403 A | 3/1962 | Belknap et al. |
| 3,059,241 A | 10/1962 | O'Brien et al. |
| 3,225,360 A | 12/1965 | Keilen, Jr. et al. |
| 3,231,635 A | 1/1966 | Holden et al. |
| 3,238,173 A | 3/1966 | Balley et al. .............. 260/29.7 |
| 3,265,765 A | 8/1966 | Holden et al. |
| 3,286,011 A | 11/1966 | Kavalir et al. |
| 3,322,856 A | 5/1967 | Holden et al. |
| 3,360,599 A | 12/1967 | Nyberg et al. .............. 264/216 |
| 3,397,265 A | 8/1968 | Ansell |
| 3,485,787 A | 12/1969 | Haefele et al. |
| 3,494,942 A | 2/1970 | Miki et al. |
| 3,503,917 A | 3/1970 | Burke, Jr. .................. 260/29.7 |
| 3,563,224 A | 2/1971 | Bryer et al. |
| 3,634,594 A | 1/1972 | Hiyama |
| 3,670,054 A | 6/1972 | De La Mare et al. |

(List continued on next page.)

FOREIGN PATENT DOCUMENTS

| | | |
|---|---|---|
| DE | 2552636 | 11/1975 |
| EP | 0224389 | 6/1987 |
| EP | 0254346 | 1/1988 |
| EP | 0488021 B1 | 6/1992 |
| WO | WO 9005166 | 5/1990 |
| WO | WO94/15997 | 7/1994 |
| WO | WO 9500586 | 1/1995 |

OTHER PUBLICATIONS

"Kraton Polymers and Compounds Typical Properties Guide" by Shell Chemical Co. (1996).

"KratonR Thermoplastic Rubber" by Shell Chemical Co. (Oct. 1989).

"Kraton Thermoplastic Rubber Medical Products" by Shell Chemical Co., Technical Bulletin SC:1032–88 (1988).

"Kraton G1650 Thermoplastic Rubber", by Shell Chemical Co., Technical Bulletin SC:38–85 (1985).

"Kraton G1652 Thermoplastic Rubber" by Shell Chemical Co., Technical Bulletin SC:39–85 (1985).

"Solution Behavior of Kraton Thermoplastic Rubbers" by Shell Chemical Co., Technical Bulletin SC:72–85 (1985).

"Gas Permeability of Kraton Rubbers" by Shell Chemical Co., Technical Bulletin SC:941–87 (1987).

"Kraton Thermoplastic Rubber—Typical Properties 1988" by Shell Chemical Co.

ASTM Standard Specification for Rubber Contraceptives (Condoms) D3492–83 (1983).

ASTM Standard Specification for Rubber Surgical Gloves, D3577–88 (1988).

ASTM Standard Specifications for Rubber Examination Gloves D3578–77 (1977).

F.T.J. Burke et al.; "Some physical factors influencing tactile perception with disposable non–sterile gloves," J. Dent, vol. 17, pp. 72–76 (1989).

P. Gergan et al.; "Hydrogenated Block Copolymers in Thermoplastic Elastomer IPNs", Chapter 14 (pp. 507–540) of Thermoplastic Elastomers, by N.R. Legge et al. 1987.

EPO Search Report for Serial No. EP 97 94 8158; Feb. 24, 2000.

Primary Examiner—Peter D. Mulcahy
(74) Attorney, Agent, or Firm—Dority & Manning, P.A.

(57) ABSTRACT

An elastomeric composition includes a single S-EB-S block copolymer having at least about 15 weight percent of styrene end blocks, wherein the weight average molecular weight of the styrene end blocks is at least about 7,000 Daltons and the weight average molecular weight of ethylene-butylene midblocks is at least about 60,000 Daltons, and a plasticizer in an amount sufficient to provide tactility in products made from the composition. To prepare articles such as medical film protective devices, the elastomeric composition is dissolved in a sufficient amount of a solvent to permit dip forming. A form having the shape of the desired product is dipped into the solution to build up a film of the elastomeric composition on the form. The dip-formed elastomeric films are free of pinholes and resistant to oxidative and ozone attack. The films are particularly suitable for use in products such as examination, surgical, and industrial gloves and condoms.

43 Claims, 5 Drawing Sheets

U.S. PATENT DOCUMENTS

| | | |
|---|---|---|
| 3,700,633 A | 10/1972 | Wald et al. |
| 3,830,767 A | 8/1974 | Condon |
| 3,933,723 A | 1/1976 | Grenness |
| 3,970,771 A | 7/1976 | Davison |
| 3,992,339 A | 11/1976 | Harlan, Jr. et al. |
| 4,006,116 A | 2/1977 | Dominguez |
| 4,033,888 A | 7/1977 | Kiovsky |
| 4,039,629 A | 8/1977 | Himes et al. |
| 4,041,103 A | 8/1977 | Davison et al. |
| 4,061,709 A | 12/1977 | Miller et al. |
| 4,070,713 A | 1/1978 | Stockum |
| 4,077,893 A | 3/1978 | Kiovsky |
| 4,123,403 A | 10/1978 | Warner et al. |
| 4,141,847 A | 2/1979 | Kiovsky |
| 4,386,179 A | 5/1983 | Sterling |
| 4,391,949 A | 7/1983 | St. Clair |
| 4,444,953 A | 4/1984 | St. Clair |
| 4,481,323 A | 11/1984 | Sterling |
| 4,511,354 A | 4/1985 | Sterling |
| 4,613,640 A | 9/1986 | Deisler et al. |
| 4,684,490 A | 8/1987 | Taller et al. |
| 4,742,578 A | 5/1988 | Seid |
| 4,769,415 A | 9/1988 | Hotta et al. |
| 4,808,174 A | 2/1989 | Sorkin |
| 4,880,878 A | 11/1989 | Himes et al. |
| 4,970,259 A | 11/1990 | Mitchell et al. |
| 5,112,900 A * | 5/1992 | Buddenhagen et al. ...... 524/484 |
| 5,120,765 A | 6/1992 | Southwick et al. .......... 524/505 |
| 5,407,715 A * | 4/1995 | Buddenhagen et al. ..... 428/35.7 |
| 5,556,911 A | 9/1996 | Walther et al. .............. 524/505 |
| 5,578,674 A | 11/1996 | Speth et al. ................. 524/575 |
| 6,117,176 A * | 9/2000 | Chen ............................ 623/36 |

* cited by examiner

ELASTOMERIC COPOLYMER COMPOSITIONS AND ARTICLES MADE THEREWITH

BACKGROUND OF THE INVENTION

This invention is related to the composition of an elastomeric copolymer, and, additionally, to the use of such an elastomeric copolymer to prepare dip-formed articles.

Thin-walled, extensible articles such as gloves, condoms, and other products have long been made from natural rubber. In normal productions, such articles are formed from natural rubber latex, a naturally occurring emulsion of rubber and water, with added stabilizing agents and vulcanizing chemicals. A form of the appropriate shape, previously coated with a coagulating solution in some cases, is dipped into the latex mixture once or several times to build up a layer of the desired thickness. The water is allowed to evaporate, leaving a solid rubber film. The film must be vulcanized to provide adequate mechanical and physical properties.

Natural rubber has many advantages in these applications, being strong and highly elastic and having good "tactility" or feeling to the user. Natural rubber has several shortcomings, such as susceptibility to "pinholes" therethrough, rapid attack by ozone which causes scission cracking, and oxidative attack during storage which causes cracking and destroys the physical integrity of the product. Natural rubber is also not hypoallergenic due to the residual surfactants, vulcanizing agents, stabilizing agents, antioxidants, and/or protein materials in the rubber. Persons who are particularly susceptible to irritation or sensitization, or use the rubber products for extended periods of time may experience allergic reactions.

Various types of synthetic elastomeric polymer products have been developed for use in thin articles produced by dip forming. Synthetic rubber compositions can be dissolved in solvents to form a true solution, so that pinholes are much less likely to be present. Many available synthetic rubber compositions have various other shortcomings, including unacceptable tactility. While each may meet some of the requirements, most do not have the required combination of strength, tactility, resistance to environmental damage, and hypoallergenicity required for many products such as examination and surgical gloves, condoms, and other medical products that are to come into contact with the human body.

An important advance in the art of synthetic elastomeric polymer products is described in U.S. Pat. Nos. 5,112,900 and 5,407,715. These patents disclose the preparation of specific styrene-ethylene/butylene-styrene (S-EB-S) block copolymer solutions and their use in the dip forming of articles. The resulting articles have excellent elastomeric properties for use in gloves, condoms, and other products. They exhibit low incidence of pinholes, good resistance to environmental damage such as oxidation and ozonation, and hypoallergenicity.

There is, however, always a need to further improve the manufacturability of articles made of such formulations and the process economics. The present invention fulfills this need, and further provides related advantages.

SUMMARY OF THE INVENTION

The present invention provides an elastomer liquid solution, process for preparation of elastomeric articles, and articles. The approach of the invention overcomes manufacturing complexities and uniformity problems associated with the technique of U.S. Pat. Nos. 5,112,900 and 5,407,715, while retaining their advantages.

In accordance with the invention, an elastomer liquid solution consists essentially of a block copolymer component comprising a single S-EB-S block copolymer, wherein the S-EB-S block copolymer has at least about 15 weight percent of styrene and blocks, and wherein the molecular weight (weight average molecular weight is used throughout) of the styrene end blocks is at least about 7,000 Daltons and the molecular weight of ethylene-butylene midblocks is at least about 60,000 Daltons. The solution further includes a plasticizer in an amount sufficient to provide tactility in dip formed products made from the composition, and a solvent in an amount sufficient to form a stable solution of the block copolymer component and the plasticizer and to permit dip forming of products from the liquid solution.

The amount of plasticizer to be used is selected in conjunction with the nature of the S-EB-S copolymer. In particular, the volume percentage of the styrene end blocks based upon the total of the S-EB-S block copolymer and plasticizer (termed herein the "end block phase volume percentage", but which can also be termed a "hard domain phase volume percentage"). Preferably, the amount of plasticizer is such that the end block phase volume percentage of the styrene end blocks is less than about 20 percent. Thus, the higher the percentage of styrene end blocks in the S-EB-S block copolymer, the larger the amount of plasticizer that may be used. On the other hand, the amount of plasticizer may not be so large that the strength of the final product is reduced below acceptable levels as required for each product.

In accordance with a processing aspect of the invention, articles are made from this liquid solution by dip forming. In this approach, there is furnished a liquid solution as described above, but wherein the molecular weight of the S-EB-S block copolymer is less than about 175,000 Daltons. A form is dipped into the solution and withdrawn, and the solvent is evaporated from the film on the form, leaving a coherent extensible film on the form in the shape of the form.

The present approach is operable to produce articles such as gloves and condoms of high quality. The articles have a combination of good strength and elasticity, together with a tactility comparable to natural as shown by low deformation stress at 50–500% elongation and highly elastic recovery. Thin goods formed of the elastomers avoid the problem of pinholes, or, alternatively stated, have a high degree of impermeability. The elastomeric composition is not prone to scission cracking upon exposure to ozone or cracking upon aging, and is well suited for use in thin goods formed by dipping, such as gloves and condoms.

These same qualities are obtained in articles made according to U.S. Pat. Nos. 5,112,900 and 5,407,715, whose disclosures are incorporated by reference. However, the approach of these patents requires the use of at least two, and preferably three, different S-EB-S copolymers. The use of different copolymers adds complexity to the manufacturing operation, and requires care in mixing and preparation of solutions. Relatively minor variations in either the properties of any of the as-purchased S-EB-S copolymer materials or their mixture proportions in solution result in a change in the viscosity and other properties of the solution. The operating parameters of the dip-forming line (e.g. solution temperature, form withdrawal rate, etc.) must be adjusted responsively, and, even then, there may result a higher incidence of defects, such as holes in the product and interfinger webs in gloves, in the finished products both as the operating parameters are responsively changed and equilibrium is again achieved, and during extended periods of operation. Also, of course, the use of multiple copolymer components requires greater logistical care in ordering, handling, and storing of the components. These difficulties are not insurmountable, and the assignee of the '900 and '715 patents, and of the present invention, has built a successful business using the approach of these patents. However, the present approach offers the important advantage of reduced manufacturing complexity and improved product yields by requiring only a single S-EB-S block copolymer.

Additionally, when two or more copolymers are mixed together in solution, there is a corresponding number of different molecular weights in the final product. Each of the individual copolymers is usually manufactured with a relatively narrow distribution in molecular weight, so that, when two copolymers are mixed together in solution, there are two different primary modes in the molecular weight distribution. The result is a degree of nonuniformity in the final polymer network, although this nonuniformity has been acceptable in products made according to the '900 and '715 patents. In the present approach using only a single copolymer, on the other hand, the microstructural uniformity of the final product is improved.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
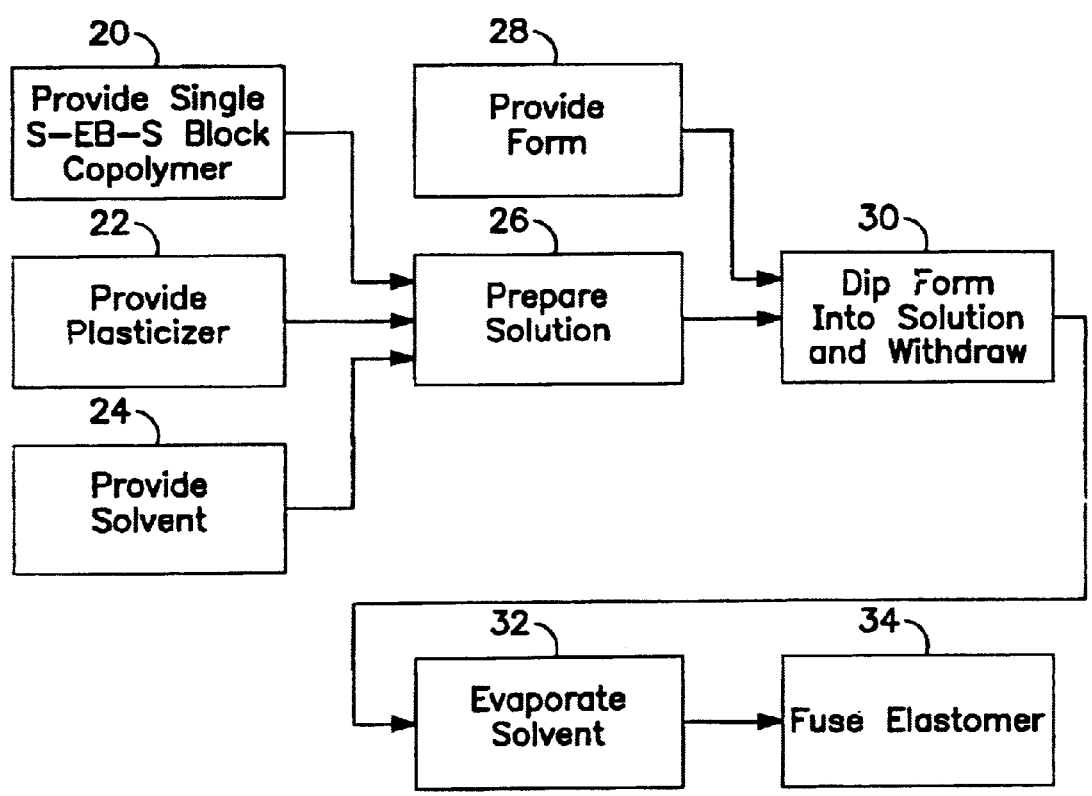
FIG. 1 is a block diagram of a method for practicing the invention.
Figure 2:
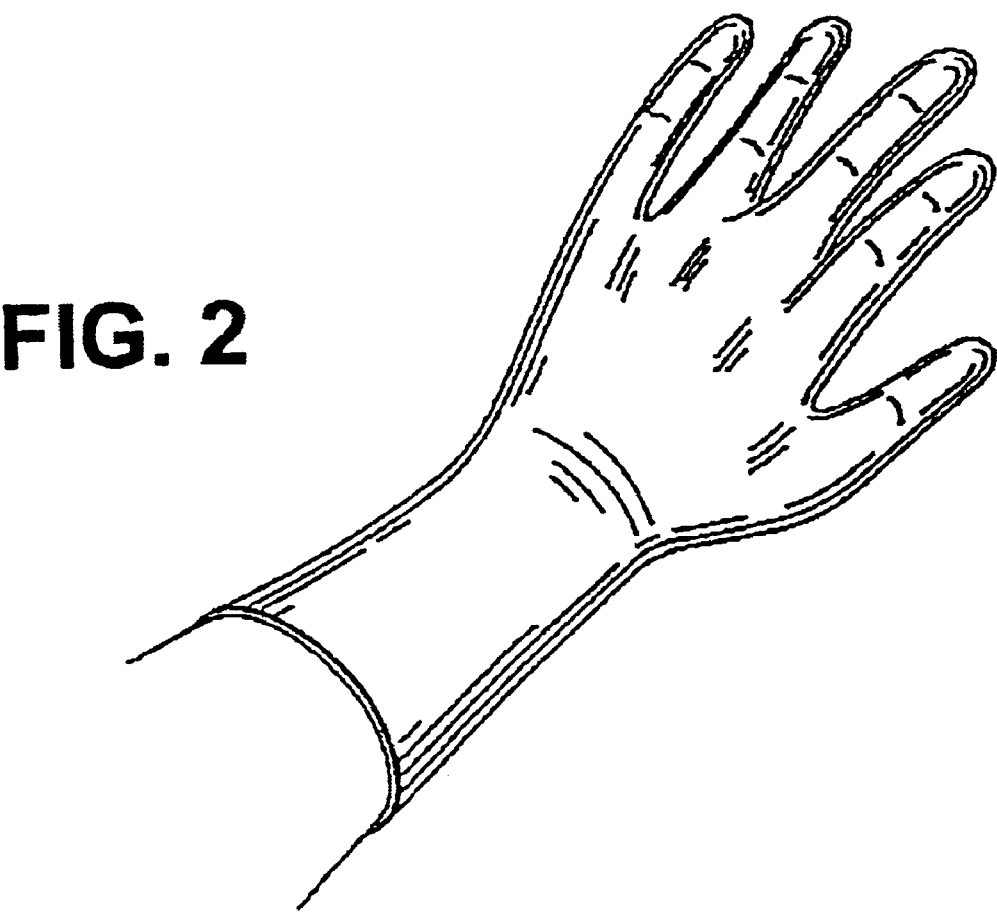
FIG. 2 is a perspective view of a glove.
Figure 3:
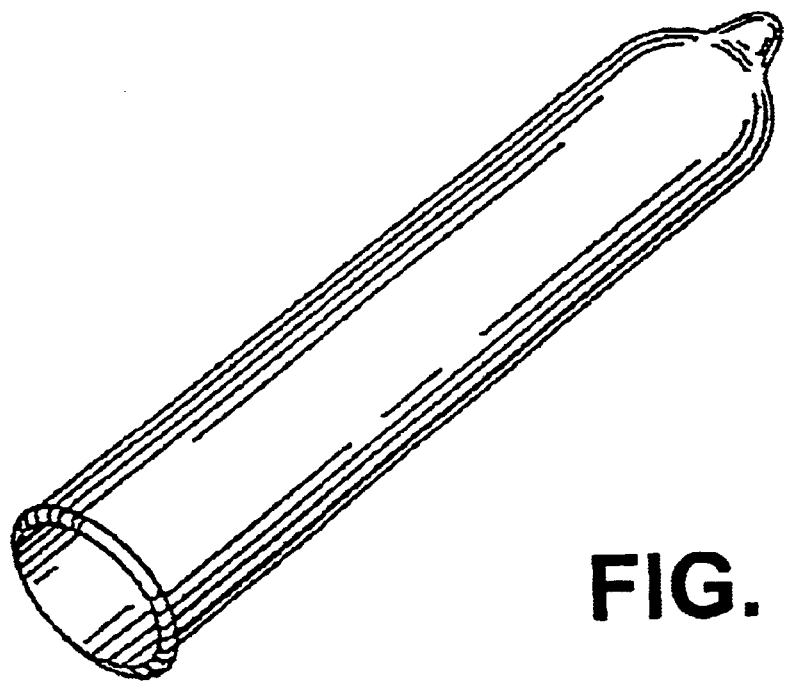
FIG. 3 is a perspective view of a condom.

FIG. 1 is a block flow diagram of a preferred method for manufacturing articles according to the invention. A single S-EB-S block copolymer is provided, numeral 20. As used herein, "single" means exactly one, and does not encompass more or less than one, block copolymer. The block copolymer is a styrene-ethylene-butylene-styrene (S-EB-S) block copolymer formed from an ethylene-butylene copolymer central block and styrene end blocks. The polystyrene end blocks typically constitute at least about 15, and preferably at least about 30, percent by weight of the total molecule. The styrene end blocks have a molecular weight of at least about 7,000 Daltons. The ethylene-butylene midblocks have a molecular weight of at least about 60,000 Daltons, preferably about 70,000 Daltons, and most preferably about 85,000 Daltons. The total molecular weight of the copolymer is typically from about 50,000 Daltons to about 300,000 Daltons. For the preferred application of dip forming articles, as discussed herein, the total molecular weight of the copolymer is less than about 175,000 Daltons, preferably less than about 150,000 Daltons, and most preferably less than about 115,000 Daltons. An operable commercially available block copolymer is Shell Kraton G1654X S-EB-S block copolymer material.

The S-EB-S block copolymer is to be distinguished from other block copolymers that have sometimes been used in synthetic rubber compositions, such as styrene-isoprene-styrene (S-I-S) and styrene-polybutydiene-styrene (S-EB-S) block copolymers. It has been known to make thin rubber-like articles from S-I-S and S-B-S block copolymers, see for example, U.S. Pat. No. 3,933,723. The use of these block copolymers eliminates the need for vulcanization of the articles, but the articles are subject to oxidation and ozone damage.

The use of an S-EB-S block copolymer, as distinct from other types, is critical to the success of the present invention, for two reasons. First, elastomers based upon the S-EB-S block elastomeric copolymers are resistant to attack by ozone, or by oxidative conditions, while S-I-S and S-B-S elastomers suffer from rapid cracking, when exposed to ozone, and cracking or hardening under oxidative conditions. Both of the latter copolymers are thus subject to failure even when protected by specific additives such as antiozonants or antioxidants which are deleterious in medical and other applications. The use of such special additives is undesirable, as they may cause allergic reactions in some persons. The present elastomeric composition is hypoallergenic and may be contacted with the skin of the user for extended periods of time. Additionally, in spite of the special additives, scission cracking can lead to premature failure by ozone cracking of the articles made from S-I-S and S-B-S compositions, particularly when the articles are stored in a folded condition and then stretched before and during use.

Second, the mechanical properties of the S-EB-S copolymers can be modified to provide the desirable combination of tensile strength, elasticity, and tactility that is required in some applications. S-EB-S elastomeric copolymers have higher tensile strength, lower elastic elongation, and higher stress at 50–500 percent elongation than the S-I-S and S-B-S elastomers. With appropriate combination of the S-EB-S copolymer and a suitable plasticizer such as a nonaromatic napthenic or paraffinic mineral oil, the elastomeric properties are ideal for these applications. The plasticizer should not swell or solubilize the polystyrene and segments.

The structure, properties, and some applications of some S-EB-S rubbers have been disclosed in U.S. Pat. Nos. 3,485,787; 3,830,767; 4,006,116; 4,039,629; 4,041,103; 4,386,179; 4,481,323; 4,511,354; and 4,613,640, whose disclosures are incorporated by reference.

By way of comparison, U.S. Pat. Nos. 4,386,179, 4,481,323, 4,511,354, and 4,613,640 disclose compositions of elastomeric copolymers with 0.1 to 7–10 percent of polysiloxane and 6–60 percent mineral oil. The addition of the polysiloxane in this range is essential to obtain marked improvements in surface smoothness that is microscopically characteristic of silicone rubber. This improved surface smoothness is necessary to many medical applications in contact with body tissue and fluids. These blends of copolymers, polysiloxane, and mineral oil require formation of the stable copolymer and polysiloxane composition at high temperatures and shearing pressures on the order of 1500–2500 psi (pounds per square inch.) It is not practically and commercially possible to form solutions from these compounds, and to dip mold thin elastomeric articles such as gloves and condoms from these compositions.

The S-EB-S block copolymer may optionally have end-block compatible resins added to the polystyrene end blocks. The added end-block compatible resin increases the glass transition temperature ($T_g$) of the S-EB-S block copolymer. The increased $T_g$ allows the final products to be used at higher temperatures than otherwise possible, as the product tends to become somewhat sticky at and above $T_g$. An example of such an end-block compatible resin is poly alpha methyl styrene. Other end block compatible styrene-containing polymers such as polystyrene may also be used. When such other sources of end-block compatible resin are present, their content is included in the determination of the end block phase volume percentage.

A plasticizer is furnished, numeral 22. The plasticizer is preferably a mineral oil, which is a refined petroleum paraffinic hydrocarbon oil described in Entries 6971 and 6972 of the Merck Index, Eighth Edition. The preferred mineral oil has a specific gravity of 0.87 at 77° F., a viscosity of 170 centistokes at 77° F., and a Hirschler molecular weight of 492.

A mutual solvent for the S-EB-S block copolymer and the plasticizer is furnished, numeral 24. The preferred solvent is toluene.

The S-EB-S block copolymer is normally furnished by the manufacturer as a solid. To form a solution from which articles can by dip formed, the S-EB-S block copolymers and the mineral oil plasticizer are dissolved in the mutual solvent, preferably toluene, to an optimal concentration of S-EB-S, numeral 26. In one approach, the formulations according to the invention are prepared by placing the block copolymers and mineral oil into a high shear mixer such as a Cowles dissolver, adding the solvent, and mixing for a sufficient time to attain a homogeneous solution, typically about one hour. The solution is set aside for a period of time, typically several hours, to deaerate.

The minimum amount of plasticizer that may be used is determined in conjunction with the nature of the S-EB-S block copolymer. In particular, the volume percentage of the styrene end blocks based upon the total of the S-EB-S block copolymer and plasticizer. Preferably, the amount of plasticizer is such that the end block phase volume percentage of the styrene end blocks is less than about 20 percent. The microstructural morphology of the final product resulting from an end block phase volume percentage of less than 20 percent in the solution exhibits excellent elasticity properties of the kind required for gloves, condoms, and other extensible products. On the other hand, the morphology resulting from an end block phase volume percentage of the styrene end blocks of more than about 20 percent is less flexible and extensible, so that the film product tends to exhibit surface cracking and porosity.

The maximum amount of the plasticizer that may be used in the solution is established by the mechanical requirements of the final product. With increasing amounts of plasticizer in the film-forming solution, the mechanical strength of the final product is reduced.

By way of explanation of the calculational approach involved, the styrene contents of the S-EB-S molecules are usually expressed in weight percentages, while the analysis of the proper amount of plasticizer is based upon an analysis in volume percentage. Straightforward calculations using density information are available for converting between weight percentages and volume percentages.

Toluene solutions of S-EB-S provide minimal viscosities of concentrated solutions compared to many other solvents. A highly concentrated solution improves dip-forming process economics by reducing the amount of solvent that must be processed in a solvent recovery operation. The S-EB-S in toluene solution is a true, stable solution, as distinct from a mixture or an emulsion. The process requires attaining such a solution, as by using a high shear mixer and mixing for a sufficient time to reach a homogeneous solution. The solution is filtered to remove any fine particulate matter.

A form in the shape of the article to be manufactured by dip forming is provided, numeral 28. Such forms are commercially available, and are typically made of aluminum, glass, plastic, or porcelain, and may optionally be coated with a release agent such as calcium carbonate slurry or calcium stearate prior to dipping. FIGS. 2–9 illustrate, by way of example and not limitation, some articles that may be prepared by this approach.

Gloves (FIG. 2) and condoms (FIG. 3) are the presently most preferred application of the invention.

Figure 4:
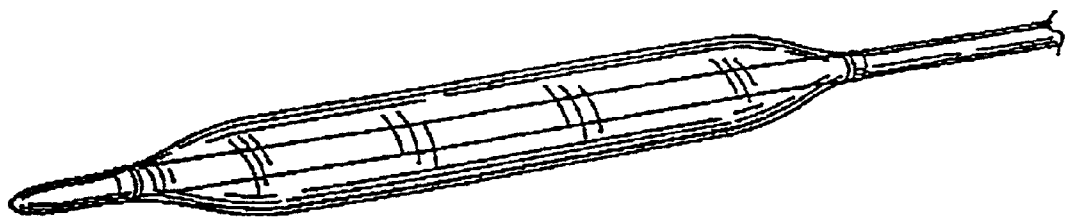
FIG. 4 is a perspective view of a dilatation balloon.

Dilatation balloons, such as shown in FIG. 4, are used in medical procedures.

Figure 5:
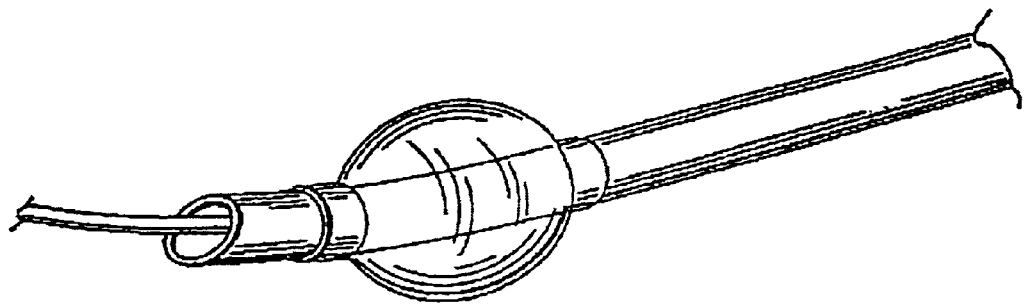
FIG. 5 is a perspective view of an inflatable cuff.

Inflatable cuffs, such as shown in FIG. 5, are used to hold instruments in place within the body. The cuff surrounds the instrument. The instrument is inserted into the body through an opening, and then the cuff is inflated to hold the instrument securely in place.

Figure 6:
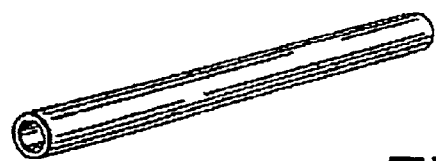
FIG. 6 is a perspective view of a surgical drain.

Drains, such as shown in FIG. 6, are pieces of tubing extending from within the body to outside the body to permit the draining of fluids from the body.

Figure 7:
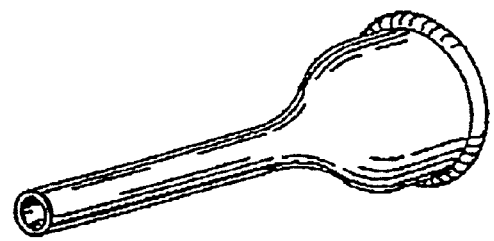
FIG. 7 is a perspective view of an external catheter.

External catheters, such as shown in FIG. 7, are placed over the penis to remove urine.

Figure 8:
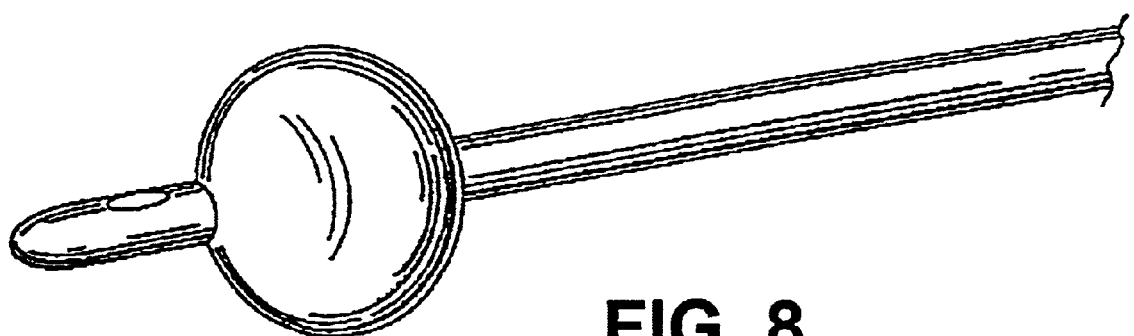
FIG. 8 is a perspective view of a catheter balloon.

Catheter balloons, such as shown in FIG. 8, are of several types. Generally, however, the catheter balloon functions in a manner somewhat similar to an inflatable cuff. The catheter is inserted into the body with the balloon deflated. When the catheter reaches its intended location, the catheter balloon is inflated.

Figure 9:
FIG. 9 is a perspective view of an instrument cover.

Instrument covers, such as shown in FIG. 9, are also of several types. Generally, some portion of an instrument must be placed into contact with the body for a period of time. The instrument cover covers and protects that portion of the instrument, such as a probe, and prevents it from contacting the body.

The feature common to these articles of most interest is that they are used in medically related applications where they must be elastomeric and must also contact the body (either externally or internally) for a period of time. The elastomer of the present invention is resistant to environmental damage so that the operability of the articles is less subject to adverse environmental influences, and also does not cause allergic or other adverse reaction in the patient or the health care worker.

The form is dipped into a container of the solution and slowly withdrawn, numeral 30, leaving a thin, uniform layer of the liquid elastomer solution deposited onto the form, much in the same manner that a layer of paint would be deposited upon the form if it were dipped into a container of paint. The form is dried in a stream of air for a predetermined time to permit the solvent in the thin elastomeric layer to evaporate at ambient temperature, numeral 32. Each dipped and dried layer is about 0.03–0.20 millimeters thick. The dipping procedure is repeated as necessary to build up a layer of the required thickness. Thin articles prepared according to the dipping process of the invention have thicknesses of from about 0.03 to about 1.0 millimeter, depending upon the thickness per layer and the number of layers. It is difficult to maintain the integrity of layers of less than about 0.03 millimeters thickness. It is difficult to prepare articles more than about 1.0 millimeters thick by dip forming, but such thicker articles can, in some cases, be prepared by multiple dipping procedures.

The resulting elastomer layer is fused by heating at 80–95° C. for 10–20 minutes, numeral 34, which improves the mechanical properties and continuity of the elastomer.

The following examples illustrate aspects of the present invention, but should not be taken as limiting of the invention. Conventional practice in the art is to specify compositions as follows. The copolymer is specified on the basis of 100 percent total, and then the plasticizer is specified as additional parts by weight of the weight of the total copolymer mass. This approach is frequently referred to as parts per hundred of rubber, or phr.

Specimens were prepared according to the approach of FIG. 1, using a condom form. The S-EB-S block copolymer was Kraton G1654X purchased from Shell Chemical Company. The styrene end blocks are about 30 weight percent of the block copolymer. The plasticizer was mineral oil, and the solvent was toluene. In a first example, the plasticizer was present in an amount of 65 phr, and in a second example the plasticizer was present in an amount of 75 phr.

To be acceptable, gloves, condoms, and like articles must meet strength, elongation, and tactility standards. The American Society for Testing and Materials has established Standard ASTM D3577-88 for rubber surgical gloves. Standard ASTM D3578-77 for rubber examination gloves, and Standard ASTM D3492-83 for rubber contraceptives (condoms). Each of these standards establishes a minimum ultimate tensile strength for the specified product under particular conditions. The minimum ultimate tensile strength specified for Type I (natural latex) surgical gloves in ASTM D3577-88 is 24 MPa. The minimum ultimate tensile strength specified for Type II (Synthetic rubber latex or rubber cement) surgical gloves in ASTM D3577-88, and that specified for condoms in ASTM D3492-83, is 17 MPa. The minimum ultimate tensile strength specified for examination gloves in ASTM D3578-77 is 21 MPa. The ASTM standards also establish maximum deformation stress at 500 percent elongation. The tactility or "feel" of the material may be evaluated objectively by measuring the deformation stress (modulus) at intermediate elongations. To have the required tactility, the modulus must be less than about 7.0 MPa at 500 percent elongation, and desirably is less than about 5.5 MPa at 500 percent elongation to satisfy the more stringent requirements of ASTM D3577-88, Type I.

The mechanical properties of the final article should have a tensile strength equal to or greater than that of the appropriate ASTM standard minimum tensile strength, and a modulus equal to or less than the appropriate ASTM standard tensile or deformation stress at 500 percent elongation.

The mechanical properties for the two examples prepared as described above were measured. For the first example, the tensile strength was 26.55 MPa, the elongation to failure was 863 percent, and the modulus at 500 percent elongation was 1.78 MPa. For the second example, the tensile strength was 24.01 MPa, the elongation to failure was 885 percent, and the modulus at 500 percent elongation was 1.62 MPa. Both of these examples satisfy all of the ASTM requirements, although the second example has barely sufficient tensile strength to meet the requirements of ASTM D3577-88 for surgical gloves. Any greater amount of plasticizer would likely leave the final product with insufficient strength to met the strength requirements of ASTM D3577-88 Type I (but it would meet the ASTM standards for other products).

Figure 10:
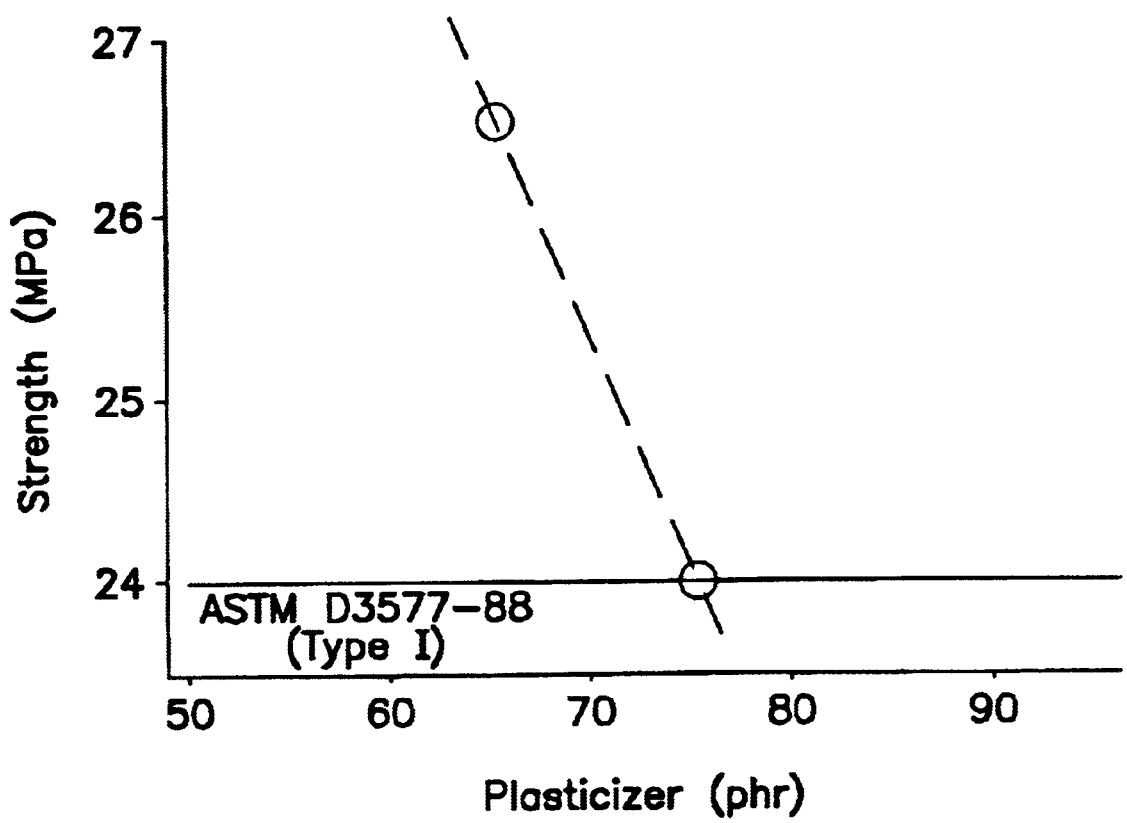
FIG. 10 is a graph of strength as a function of relative amount of plasticizer.

The present approach thus provides a straightforward procedure to evaluating the amount of plasticizer that is operable for use with the single S-EB-S block copolymer to result in a suitable final product. The minimum limit of plasticizer is selected such that the end block phase volume percentage of the styrene in the mixture of S-EB-S block copolymer and plasticizer is less than about 20 percent. The maximum limit of plasticizer is selected as illustrated in FIG. 10 for the data of the example. A correlation is established between strength (or other limiting property) and the amount of plasticizer. A limiting level is indicated according to the final product requirements (24 MPa as provided in ASTM D3577, for example). The maximum limit of plasticizer is that which provides sufficient properties, and is about 75 phr in the example.

These results establish that a single, carefully chosen S-EB-S copolymer-based elastomer in a proper amount of a plasticizer meets the ASTM standards and can achieve comparable, and in many cases superior, mechanical properties to those of natural latex. This result is significant, because it means that the material of the invention can perform mechanically in a manner comparable with or superior to that of natural rubber, while avoiding the shortcomings of natural rubber such as susceptibility to pinholes, oxidative attack, ozone attack, and allergenicity. No other material is known which has all of these features.

The present invention provides an improved elastomer formulation for the preparation of dip-formed articles having properties superior to those previously available. Although particular embodiments of the invention have been described in detail for purposes of illustration, various modifications may be made without departing from the spirit and scope of the invention. Accordingly, the invention is not to be limited except as by the appended claims.

What is claimed is:

1. A process for the preparation of elastomeric articles, comprising the steps of:
    furnishing a liquid solution comprising;
        a block copolymer consisting essentially of a single S-EB-S block copolymer, the S-EB-S block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons, and wherein the weight average molecular weight of the S-EB-S block copolymer is less than about 175,000 Daltons;
        a plasticizer in an amount sufficient to provide tactility in dip formed products made from the composition; and
        a solvent in an amount sufficient to form a stable solution of the block copolymer component and the plasticizer and to permit dip forming of products from the liquid solution;
    dipping a form into the solution and withdrawing the form from the solution; and
    evaporating the solvent from the film on the form, leaving a coherent extensible film on the form.

2. The method of claim 1, wherein the step of furnishing includes the step of
    providing the plasticizer in an amount such that the end block phase volume percentage of the styrene relative to the total of block copolymer and plasticizer is no greater than about 20 percent.

3. A dip formed elastomer article comprising a thin film having a thickness of from about 0.03 to about 1.0 millimeters, the film being formed of an elastomer comprising a block copolymer consisting essentially of a single S-EB-S block copolymer, the S-EB-S block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons, and wherein the weight average molecular weight of the S-EB-S block copolymer is less than about 175,000 Daltons, and a plasticizer in an amount sufficient to provide tactility in the dip formed article.

4. The article of claim 3, wherein the S-EB-S block copolymer has about 30 weight percent of styrene end blocks.

5. The article of claim 3, wherein the plasticizer is present in an amount such that the end block phase volume percentage of the styrene relative to the total of the block copolymer and plasticizer is no greater than about 20 percent.

6. A dip formed elastomeric article comprising:

a block copolymer consisting essentially of a single styrene-ethylene-butylene-styrene block copolymer, the styrene-ethylene-butylene-styrene block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons; and a plasticizer in an amount sufficient to provide tactility in the dip formed article.

7. The elastomeric article of claim 6, wherein the plasticizer is present in an amount such that the end block phase volume percentage of the styrene relative to the total of block copolymer and plasticizer is no greater than about 20%.

8. The elastomeric article of claim 6, wherein the plasticizer is mineral oil.

9. The elastomeric article of claim 6, wherein the weight average molecular weight of the ethylene-butylene midblocks is at least about 70,000 Daltons.

10. The elastomeric article of claim 6, wherein the weight average molecular weight of the ethylene-butylene midblocks is at least about 85,000 Daltons.

11. The elastomeric article of claim 6, wherein the weight average molecular weight of the styrene-ethylene-butylene-styrene block copolymer is less than about 175,000 Daltons.

12. The elastomeric article of claim 6, wherein the weight average molecular weight of the styrene-ethylene-butylene-styrene block copolymer is less than about 150,000 Daltons.

13. The elastomeric article of claim 6, wherein the weight average molecular weight of the styrene-ethylene-butylene-styrene block copolymer is less than about 115,000 Daltons.

14. A dip formed elastomeric article comprising a film, said film being formed of an elastomer comprising:

a block copolymer consisting of a single styrene-ethylene-butylene-styrene block copolymer, the styrene-ethylene-butylene-styrene block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons; and a plasticizer in an amount sufficient to provide tactility in the dip formed article.

15. The elastomeric article of claim 14, wherein the plasticizer is present in an amount such that the end block phase volume percentage of the styrene relative to the total of block copolymer and plasticizer is no greater than about 20%.

16. The elastomeric article of claim 14, wherein the plasticizer is mineral oil.

17. The elastomeric article of claim 14, wherein the weight average molecular weight of the ethylene-butylene midblocks is at least about 70,000 Daltons.

18. The elastomeric article of claim 14, wherein the weight average molecular weight of the ethylene-butylene midblocks is at least about 85,000 Daltons.

19. The elastomeric article of claim 14, wherein the weight average molecular weight of the styrene-ethylene-butylene-styrene block copolymer is less than about 175,000 Daltons.

20. The elastomeric article of claim 14, wherein the weight average molecular weight of the styrene-ethylene-butylene-styrene block copolymer is less than about 150,000 Daltons.

21. The elastomeric article of claim 14, wherein the weight average molecular weight of the styrene-ethylene-butylene-styrene block copolymer is less than about 115,000 Daltons.

22. The elastomeric article of claim 14, wherein the thickness of said film is from about 0.03 to about 1.0 millimeters.

23. A process for preparing elastomeric articles comprising:

furnishing a liquid solution comprising;

i) a block copolymer consisting of a single styrene-ethylene-butylene-styrene block copolymer, the styrene-ethylene-butylene-styrene block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons;

ii) a plasticizer in an amount sufficient to provide tactility in dip formed products made from the composition; and iii) a solvent in an amount sufficient to form a stable solution of the block copolymer component and the plasticizer and to permit dip forming of products from the liquid solution;

dipping a form into the solution and withdrawing the form from the solution; and evaporating the solvent from the film on the form, leaving a coherent extensible film on the form.

24. The process of claim 23, wherein the plasticizer is present in an amount such that the end block phase volume percentage of the styrene relative to the total of block copolymer and plasticizer is no greater than about 20%.

25. A process as defined in claim 1, wherein the form is in the shape of a hand for forming a glove.

26. A process as defined in claim 1, further comprising the step of removing the coherent extensible film from the form.

27. A dip formed elastomer article as defined in claim 3, wherein the article is a glove.

28. A dip formed elastomer article as defined in claim 3, wherein the article is a condom.

29. An elastomeric article as defined in claim 6, wherein the article comprises a glove.

30. An elastomeric article as defined in claim 6, wherein the article comprises a condom.

31. An elastomeric article as defined in claim 6, wherein the article comprises an article selected from the group consisting of a dilation balloon, an inflatable cuff, an external catheter, and a catheter balloon.

32. An elastomeric article as defined in claim 14, wherein the article comprises a glove.

33. An elastomeric article as defined in claim 14, wherein the article comprises a condom.

34. A process as defined in claim 23, wherein the form is in the shape of a hand for forming a glove.

35. A process as defined in claim 23, further comprising the step of removing the coherent extensible film from the form.

36. An elastomeric article comprising:
a block copolymer consisting essentially of a single styrene-ethylene-butylene-styrene block copolymer, the styrene-ethylene-butylene-styrene block copolymer having at least about 15 weight percent of styrene end blocks, and wherein the weight average molecular weight of the styrene end blocks is at least about 7,000 Daltons and the weight average molecular weight of ethylene-butylene midblocks is at least about 60,000 Daltons;
a plasticizer;
and wherein the article is a glove or a condom.

37. The elastomeric article of claim 36, wherein the plasticizer is present in an amount such that the end block phase volume percentage of the styrene relative to the total of block copolymer and plasticizer is no greater than about 20%.

38. The elastomeric article of claim 36, wherein the plasticizer is mineral oil.

39. The elastomeric article of claim 36, wherein the weight average molecular weight of the ethylene-butylene midblocks is at least about 70,000 Daltons.

40. The elastomeric article of claim 36, wherein the weight average molecular weight of the ethylene-butylene midblocks is at least about 85,000 Daltons.

41. The elastomeric article of claim 36, wherein the weight average molecular weight of the styrene-ethylene-butylene-styrene block copolymer is less than about 175,000 Daltons.

42. The elastomeric article of claim 36, wherein the weight average molecular weight of the styrene-ethylene-butylene-styrene block copolymer is less than about 150,000 Daltons.

43. The elastomeric article of claim 36, wherein the weight average molecular weight of the styrene-ethylene-butylene-styrene block copolymer is less than about 115,000 Daltons.

* * * * *